United States Patent
Hoffmann et al.

(10) Patent No.: US 8,930,530 B2
(45) Date of Patent: Jan. 6, 2015

(54) MOBILE AND BROWSER APPLICATION PERFORMANCE MANAGEMENT

(75) Inventors: Martin Hoffmann, Heidelberg (DE); Tobias Tresl, Malsch (DE)

(73) Assignee: SAP SE, Walldorf (DE)

( * ) Notice: Subject to any disclaimer, the term of this patent is extended or adjusted under 35 U.S.C. 154(b) by 382 days.

(21) Appl. No.: 13/283,946

(22) Filed: Oct. 28, 2011

(65) Prior Publication Data

US 2013/0111007 A1   May 2, 2013

(51) Int. Cl.
  *G06F 15/16* (2006.01)
  *G06F 11/34* (2006.01)

(52) U.S. Cl.
  CPC .................................. *G06F 11/34* (2013.01)
  USPC ............ 709/224; 709/223; 709/225; 709/242

(58) Field of Classification Search
  USPC .......... 709/223, 224, 225, 220; 702/182, 184, 702/186
  See application file for complete search history.

(56) References Cited

U.S. PATENT DOCUMENTS

| | | | |
|---|---|---|---|
| 5,504,894 A | 4/1996 | Ferguson et al. | |
| 5,696,701 A * | 12/1997 | Burgess et al. | 714/25 |
| 6,108,700 A | 8/2000 | Maccabee et al. | |
| 6,961,539 B2 | 11/2005 | Schweinhart et al. | |
| 6,970,929 B2 | 11/2005 | Bae et al. | |
| 7,624,047 B1 | 11/2009 | Round | |
| 7,698,397 B2 * | 4/2010 | Pang et al. | 709/223 |
| 7,870,568 B2 | 1/2011 | Bernardin et al. | |
| 2004/0015714 A1 * | 1/2004 | Abraham et al. | 713/200 |
| 2004/0098478 A1 * | 5/2004 | Koetke et al. | 709/224 |
| 2007/0083813 A1 * | 4/2007 | Lui et al. | 715/709 |
| 2007/0143290 A1 | 6/2007 | Fujimoto et al. | |

OTHER PUBLICATIONS

"Congestion Management Overview"—Cisco, May 2007 http://www.cisco.com/c/en/us/td/docs/ios/12_2/qos/configuration/guide/fqos_c/qcfconmg.pdf.*

* cited by examiner

*Primary Examiner* — Randy Scott
(74) *Attorney, Agent, or Firm* — Kenyon & Kenyon LLP

(57) ABSTRACT

A system and method are described herein that provide performance data based on a monitoring of the performance on the end user side. A client application running on a user terminal is instrumented to record client performance counters on the user side. An application server matches the performance counters from the user side and performance counters obtained from the server side having the same transaction identification number. The system and method provides an end-to-end view of the user's perceived performance based on the transactions made by the user.

28 Claims, 2 Drawing Sheets

MOBILE AND BROWSER APPLICATION PERFORMANCE MANAGEMENT

FIELD OF THE INVENTION

The present invention relates to a process for monitoring the performance of web and other client/server applications on a user side. The present invention further relates to determining performance data on a user side to manage a web application's performance. The present invention further relates to instrumenting a client application to record performance counters to improve performance on a user side.

BACKGROUND INFORMATION

Performance management of web applications allows for the monitoring and measurement of relevant performance metrics to assess the performance of applications. Such assessment is necessary as it enables the detection, diagnosis, and remedying of an application's performance to ensure that it meets or exceeds an end user's expectations. The performance of web applications can be monitored, using instrumentation based on the technology being used. Products such as Introscope™ allow for instrumentation and monitoring possibilities for java-based web applications. Alternatively, there also exists a number of software as a service providers which deliver performance data from an application server based on each user request or deliver performance data based on a combination of requests.

While software as a service providers and software such as Introscope™ may provide important information about the performance of a server, the performance data provided only provides information about the performance on the server side and does not provide information about the performance on the end user side. The delivered data may convey information including the server response time, but does not provide information about an end user response time. Much of an end user response time depends on the device that the user is connecting to the server with, the type of connection that the user is making (i.e. such using Ethernet, wireless, or connecting through a mobile network). Depending on the device a user is connecting to a server with, over 70% of the end user response time may be broken down into time spent parsing or rendering through the data. Users using mobile clients typically suffer from a significantly higher end user response time than users using a desktop computer, even though the server response time is the same for both devices.

Ultimately, performance data that is transmitted back from software such as Introscope™ or by any of the software as a service providers sending real time performance data, does not provide or factor in data such as client rendering time, unzip time, or parsing time. Moreover, this delivered performance data does not factor in the memory allocation on a user's device, the transferred and received bytes on a user's device, the input/output of a device (i.e. such as time spent reading or writing to disk or flash memory on a mobile device), or other key performance indicators on the user side.

Thus there remains a need in the art, for a system and method which allows for the generation of performance data based on the monitoring of the performance on a user's side. There also remains a need in the art, for a system and method which allows for the improvement of an application's performance based on the monitoring of the performance on the user side and integrating with the monitoring of the performance on the server side.

SUMMARY OF THE INVENTION

A system and method are described herein that provide performance data based on a monitoring of the performance on the end user side. A client application running on a user terminal may be instrumented to record client performance counters on the user side. An application server may match the performance counters from the user side and performance counters obtained from the server side having the same transaction identification number.

In particular, the exemplary embodiments and/or exemplary methods of the present invention are directed to a method for monitoring the performance of an application on a user terminal, the method comprising: instrumenting the application on the user terminal to measure client performance counters; assigning the client performance counters to a transaction identification number; storing the client performance counters in a performance database; instrumenting a business application server to measure server performance counters; mapping the server performance counters to the respective transaction identification number; storing the server performance counters in a performance database; combining the client performance counters and the server performance counters having the respective transaction identification number; and transmitting combined performance counters to a performance monitoring application client.

The exemplary embodiments and/or exemplary methods of the present invention further provide for the foregoing method in which the combined performance counters are displayed on the performance monitoring application client.

The exemplary embodiments and/or exemplary methods of the present invention further provide for the foregoing method in which instrumenting of the application includes logging execution of triggered browser events.

The exemplary embodiments and/or exemplary methods of the present invention further provide for the foregoing method in which instrumenting of the application includes logging execution of runtime events of the application.

The exemplary embodiments and/or exemplary methods of the present invention further provide for the foregoing method in which the client performance counters include webpage rendering, webpage loading, and webpage navigation.

The exemplary embodiments and/or exemplary methods of the present invention further provide for the foregoing method in which source code of the business application server is instrumented.

The exemplary embodiments and/or exemplary methods of the present invention further provide for the foregoing method in which bytecode of the business application server is instrumented.

The exemplary embodiments and/or exemplary methods of the present invention further provide for the foregoing method in which the server performance counters are measured for each user request triggered by a user interaction.

The exemplary embodiments and/or exemplary methods of the present invention further provide for the foregoing method in which the transaction identification number is a universally unique identifier generated by the application and attached to a server request.

The exemplary embodiments and/or exemplary methods of the present invention further provide for the foregoing method in which the client performance counters are transmitted from the user terminal to a performance data server.

The exemplary embodiments and/or exemplary methods of the present invention further provide for the foregoing method in which the server performance counters are transmitted from the business application server to a performance data server.

The exemplary embodiments and/or exemplary methods of the present invention further provide for the foregoing method in which the client performance counters with the transaction identification are retrieved from the performance database to combine with the server performance counters.

The exemplary embodiments and/or exemplary methods of the present invention further provide for the foregoing method in which timestamps of the browser events are evaluated to calculate the client performance counters.

The exemplary embodiments and/or exemplary methods of the present invention further provide for the foregoing method in which timestamps of the runtime events are evaluated to calculate the client performance counters.

The exemplary embodiments and/or exemplary methods of the present invention further provide for a system for monitoring the performance of an application on a user terminal, the system comprising: the user terminal displaying the application; a business application server transmitting server performance counters; and an application performance management server providing the following: instrument the application on the user terminal to measure client performance counters; assign the client performance counters to a transaction identification number; store the client performance counters in a performance database; instrument the application server to measure server performance counters; map the server performance counters to the respective transaction identification number; combine the client performance counters and the server performance counters having the respective transaction identification number; and transmit combined performance counters to a performance monitoring application client.

The exemplary embodiments and/or exemplary methods of the present invention further provide for the foregoing system in which a performance monitoring application client displays the combined performance counters.

The exemplary embodiments and/or exemplary methods of the present invention further provide for the foregoing system in which instrumenting of the application includes logging execution of triggered browser events.

The exemplary embodiments and/or exemplary methods of the present invention further provide for the foregoing system in which instrumenting of the application includes logging execution of runtime events of the application.

The exemplary embodiments and/or exemplary methods of the present invention further provide for the foregoing system in which the client performance counters include webpage rendering, webpage loading, and webpage navigation.

The exemplary embodiments and/or exemplary methods of the present invention further provide for the foregoing system in which source code of the business application server is instrumented.

The exemplary embodiments and/or exemplary methods of the present invention further provide for the foregoing system in which byte code of the business application server is instrumented.

The exemplary embodiments and/or exemplary methods of the present invention further provide for the foregoing system in which the server performance counters are measured for each user request triggered by a user interaction.

The exemplary embodiments and/or exemplary methods of the present invention further provide for the foregoing system in which the transaction identification number is a universally unique identifier generated by the application and attached to a server request.

The exemplary embodiments and/or exemplary methods of the present invention further provide for the foregoing system in which the client performance counters are transmitted from the user terminal to a performance data server.

The exemplary embodiments and/or exemplary methods of the present invention further provide for the foregoing system in which the server performance counters are transmitted from the business application server to a performance data server.

The exemplary embodiments and/or exemplary methods of the present invention further provide for the foregoing system in which the client performance counters with the transaction identification are retrieved from the performance database to combine with the server performance counters.

The exemplary embodiments and/or exemplary methods of the present invention further provide for the foregoing system in which timestamps of the browser events are evaluated to calculate the client performance counters.

The exemplary embodiments and/or exemplary methods of the present invention further provide for the foregoing system in which timestamps of the runtime events are evaluated to calculate the client performance counters.

DETAILED DESCRIPTION

The subject invention will now be described in detail for specific preferred embodiments of the invention, it being understood that these embodiments are intended only as illustrative examples and the invention is not to be limited thereto.

Providing performance data from a server side may not provide a true representation of the performance on the end user side and the actual end user response time as it ignores the presence of a number of key performance indicators. Exemplary embodiments of the present invention provide a system and method that may provide performance data based on a monitoring of the performance on the end user side. A client application running on a user terminal may be instrumented to record performance counters on the user side. An application server may match the performance counters from the user side and performance counters obtained from the server side using a transaction identification number. The system and method may provide an end-to-end view of the user's perceived performance based on the transactions made by the user.

Figure 1:
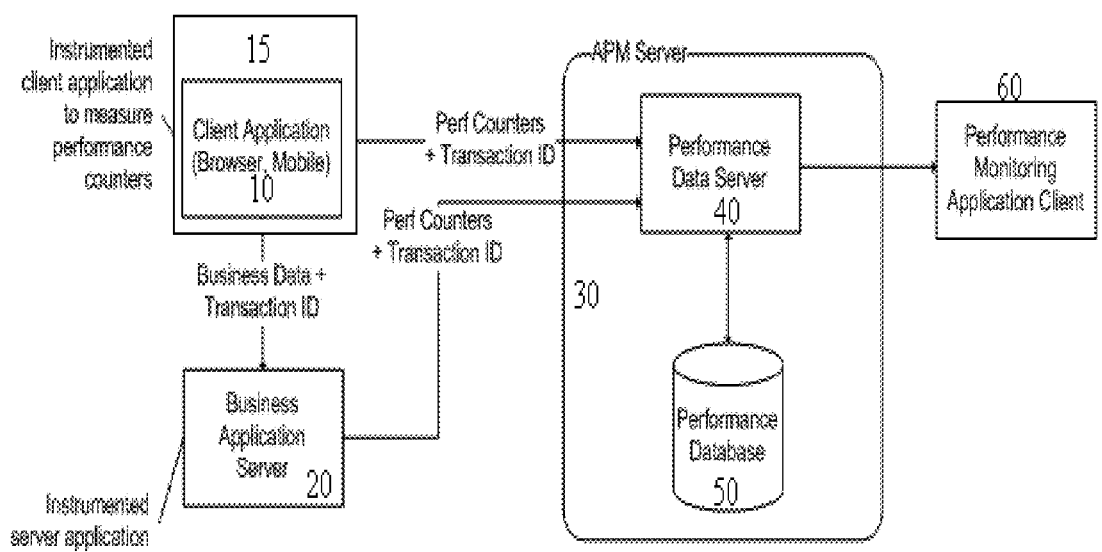
FIG. 1 is a system diagram of the monitoring of a client application connecting to a server according to the present invention.

FIG. 1 illustrates a system diagram of the monitoring of a client application. In FIG. 1, a user may connect to server 30, through user terminal 10. Server 30 may be an application performance management ("APM") server. User terminal may contain a display or monitor that displays a client application 15. APM server 30 may be implemented remotely using processing circuits or devices or combinations thereof, such as, for example, a central processing unit (CPU) of a personal computer (PC) or other workstation processor. The user terminal 10 may be embodied, for example, as a desktop, laptop, hand-held device, personal digital assistant (PDA), television set-top Internet appliance, mobile telephone, smart phone, iPod™, iPhone™, iPad™, etc., or as a combination of one or more thereof, or other comparable device.

The APM server 30 may include a performance data server 40 and a performance database 50. Performance data server 40 may accept requests from client application 15 and from a business application server 20 to store performance counters in performance database 50. Performance database 50 may communicate with performance data server 40 and may transmit stored performance information about client application 15 to performance data server 40. Performance database 50 may store performance counters about client application 15 and a transaction identification number attached to the client performance counters. Performance database 50 may also store performance counters of the server application and a transaction ID attached to the server performance counters. Server and client performance counters and their respective transaction identification numbers may be retrieved from performance database 50 and transmitted to performance data server 40.

Performance counters may be transmitted to APM server 30 from client application 15 through instrumentation. In an embodiment, the coding of client application 15 may be instrumented in the software development kit to obtain the performance counters for each user interaction step. In an alternate embodiment, the runtime of client application 15 may be instrumented to obtain the relevant performance counters.

The instrumentation of client application 15 may depend on the type of device of the user terminal 10. In an example embodiment, client application 15 may be a browser-based application. In this embodiment, instrumentation may be done through the monitoring of specific browser events. As certain browser events may trigger the execution of certain JavaScript event handlers, the occurrence of these event handlers may be evaluated and logged. These events may be evaluated to ascertain specific information about client application 15. Timestamps for the logged events may be evaluated and used to calculate specific times intervals for such activities as client rendering, webpage loading, and navigation of a webpage.

Client application 15 may be instrumented via instrumentation points, which are used during the application runtime to log specific events. This may occur in instances where client application 15 is either a mobile based application or a browser-based application. In an example embodiment, during runtime of client application 15 specific events that are triggered by runtime may be logged. The timestamp of these events may be evaluated and stored, and a specific time interval may be calculated for the performance event. Additionally, in addition to the calculated intervals, other performance counters may be obtained. These performance counters may relate to, for example, consumed memory, network roundtrips, network data transfer, network time, response parsing time, and consumed computer processing time. Additional performance counters may also be obtained, and the total number of performance counters and type of each of the performance counters may depend on the platform hosting client application 15 on user terminal 10 and the type of device that user terminal 10 is. For example, in an embodiment where user terminal 10 is a desktop computer, there may be a higher number of performance counters that are obtained for the client application 15. Conversely, in an embodiment where user terminal 10 is a mobile device using, for example, iOS, there may be a lower number of performance counters obtained for the iOS application, due to the limited interface of the platform.

Client performance counters that are obtained from client application 15 may be transmitted from user terminal 10 to performance data server 40. Client application 15 may also attach a transaction identification number with the obtained client performance counters. The transaction identification number may represent one user interaction step and may be a universally unique identifier which may subsequently be attached to a server request. The transaction identification number may be attached to the collection of performance counters from client application 15 and the collection of performance counters and the transaction identification number may be transmitted to performance data server 40 and stored in performance database 50.

Other data may also be transmitted from client application 15 to performance data server 40 along with the transaction identification number and the client performance counters. This may include data such as the name of the transaction/user interaction step. Transmittal of the client performance counters and the transaction identification number may be done after all client performance data is collected from the client application and may be done asynchronously with the transmittal of the server performance counters. In an embodiment, the client performance counters and the transaction identification number may be stored in performance database 50 and transferred to performance data server 40 at certain time intervals only.

In an example embodiment, the user interaction may involve several requests from a user to APM server 30. In this scenario each request for performance data may be transmitted individually from user terminal 10. This is possible, because each performance data request may be attached with the same transaction identification number, which may be stored in performance database 50 and evaluated by the performance data server 40.

The system may also include business application server 20. Business application server 20 may provide information of the performance on the server application on the server side. The server coding from business application server 20 may be instrumented to obtain server performance counters. In an embodiment, instrumentation of the coding of business application server 20 may be done through instrumentation of the actual source code of the server. In an alternate embodiment, instrumentation of the coding of business application server 20 may be done through instrumentation of the byte code. In an embodiment, instrumentation may be done within the framework used by a developer, in the event that the source code is unavailable or simply to allow for instrumentation without an application developer needing to do their own source code instrumentation.

The instrumentation of the coding from business application server 20 may obtain performance counters for business application server 20. Certain time intervals may be measured from the timestamps of the server events and compute the server performance counters. Examples of server performance counters that may be measured respective to each user, include elapsed time on the server end, any memory consumption by the user, computer processing time, and other statistics.

Server performance counters that are obtained from business application server 20 may be transmitted to performance data server 40. Business application server 20 may also attach a transaction identification number with the obtained server performance counters. The transaction identification number on the server end may also be a universally unique identifier. The transaction identification number for the server performance counters may map to a corresponding client transaction identification number, with the same universally unique identifier being used for both. A transaction identification number may be generated on client application 15 and attached to a server request. Business application server 20 may then use the same transaction identification number to transmit its performance counters to APM server 30.

The transaction identification number may be attached to the collection of performance counters from business application server 20 and the collection of performance counters and the transaction identification number may be transmitted to performance data server 40 and stored in performance database 50. Performance database 50 may store the server performance counters along with the client performance counters having the same transaction identification number.

APM server 30 may also act as a server for the performance monitoring application client 60. Performance monitoring application client 60 may be displayed on a separate terminal (not pictured). This terminal may contain a display or monitor that displays the performance monitoring application client 60. The terminal may be embodied, for example, as a desktop, laptop, hand-held device, personal digital assistant (PDA), television set-top Internet appliance, mobile telephone, smart phone, iPod™, iPhone™, iPad™, etc., or as a combination of one or more thereof, or other comparable device.

Performance monitoring application client 60 may receive the transmitted server and client performance counters from performance data server 40. Performance monitoring application client 60 may provide a console to users such as developers or operators, to display the collected performance data from both client application 15 and business application server 20. This collected performance data may be displayed in the form of charts, graphs, reports or any other viable display. Additionally, the performance data may be available in an offline fashion via some Export option. In an embodiment, warnings may be provided by performance monitoring application client 60 if user transactions are too slow. This may occur in instances where a service provider has a service level agreement to provide a minimum user response time. In an alternate embodiment, the acquired performance data may be filtered for a specification interaction step or for a threshold of a server or client performance counter.

Figure 2:
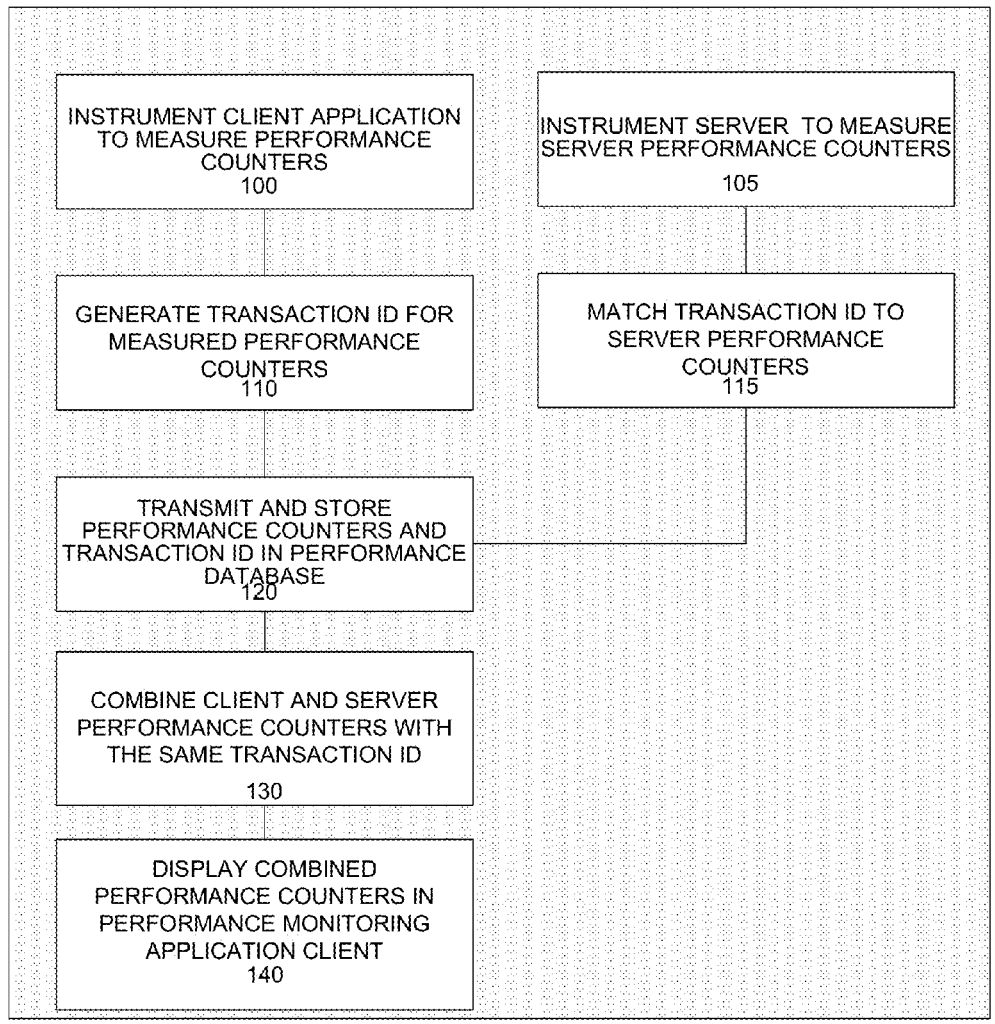
FIG. 2 is a process flow diagram of the process of monitoring a client application connecting to a server during operation according to the present invention.

FIG. 2 illustrates a process flow diagram of the process of monitoring the client application during operation. During operation, a user on a user terminal 10 may transmit data to APM server 30 via a client application 15 on the user terminal. In step 100, the client application 15 may be instrumented in order to measure the client performance counters of the application. In step 110, a transaction identification number may be generated and attached to the collection of client performance counters. The generated client performance counters and the attached transaction identification number may be transmitted to the performance data server 40 and stored in the performance database 50 in step 120.

At some time after step 110, in step 105, business application server 20 may be instrumented to measure the server performance counters of the server. In step 115, the transaction identification number generated for the client performance counters may be identified and matched to the server performance counters. The server performance counters and the assigned transaction identification number may be transmitted to the performance data server 40 and stored in performance database 50 in step 120.

In step 130, the client performance counters and the server performance counters having the same transaction identification number may be retrieved by performance data server 40 from performance database 50 and combined. Both the client performance counters and the server performance counters may be transmitted from the performance data server 40 to a performance managing client application 60. These performance counters may be displayed in step 140.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for monitoring the performance of an application on a user terminal, the method comprising:
    instrumenting the application on the user terminal to measure client performance counters on an end user side;
    assigning the client performance counters to a transaction identification number;
    storing the client performance counters in a performance database;
    instrumenting a business application server to measure server performance counters on a server side;
    mapping the server performance counters to the respective transaction identification number;
    storing the server performance counters in the performance database;
    combining the client performance counters and the server performance counters having the respective transaction identification number; and
    transmitting combined performance counters to a performance monitoring application client.

2. The method according to claim 1, further comprising:
    displaying the combined performance counters on the performance monitoring application client.

3. The method according to claim 1, wherein instrumenting of the application includes logging execution of triggered browser events.

4. The method according to claim 1, wherein instrumenting of the application includes logging execution of runtime events of the application.

5. The method according to claim 1, wherein the client performance counters include webpage rendering, webpage loading, and webpage navigation.

6. The method according to claim 1, wherein source code of the business application server is instrumented.

7. The method according to claim 1, wherein byte code of the business application server is instrumented.

8. The method according to claim 1, wherein the server performance counters are measured for each user request for user interaction.

9. The method according to claim 1, wherein the transaction identification number is a universally unique identifier generated by the application and attached to a server request.

10. The method according to claim 1, wherein the client performance counters are transmitted from the user terminal to a performance data server.

11. The method according to claim 1, wherein the server performance counters are transmitted from the business application server to a performance data server.

12. The method according to claim 1, wherein the client performance counters with the transaction identification are retrieved from the performance database to combine with the server performance counters.

13. The method according to claim 3, wherein timestamps of the browser events are evaluated to calculate the client performance counters.

14. The method according to claim 4, wherein timestamps of the runtime events are evaluated to calculate the client performance counters.

15. A system for monitoring the performance of an application on a user terminal, the system comprising:
    the user terminal displaying the application;
    a business application server transmitting server performance counters; and
    an application performance management server providing the following:

instrumenting the application on the user terminal to measure client performance counters on an end user side;

assigning the client performance counters to a transaction identification number;

storing the client performance counters in a performance database;

instrumenting the application server to measure server performance counters on a server side;

mapping the server performance counters to the respective transaction identification number;

storing the server performance counters in a performance database;

combining the client performance counters and the server performance counters having the respective transaction identification number; and transmitting combined performance counters to a performance monitoring application client.

16. The system according to claim 15, wherein a performance monitoring application client displays the combined performance counters.

17. The system according to claim 15, wherein instrumenting of the application includes logging execution of triggered browser events.

18. The system according to claim 15, wherein instrumenting of the application includes logging execution of runtime events of the application.

19. The system according to claim 15, wherein the client performance counters include webpage rendering, webpage loading, and webpage navigation.

20. The system according to claim 15, wherein source code of the business application server is instrumented.

21. The system according to claim 15, wherein byte code of the business application server is instrumented.

22. The system according to claim 15, wherein the server performance counters are measured for each user request for user interaction.

23. The system according to claim 15, wherein the transaction identification number is a universally unique identifier generated by the application and attached to a server request.

24. The system according to claim 15, wherein the client performance counters are transmitted from the user terminal to a performance data server.

25. The system according to claim 15, wherein the server performance counters are transmitted from the business application server to a performance data server.

26. The system according to claim 15, wherein the client performance counters with the transaction identification are retrieved from the performance database to combine with the server performance counters.

27. The system according to claim 17, wherein timestamps of the browser events are evaluated to calculate the client performance counters.

28. The system according to claim 18, wherein timestamps of the runtime events are evaluated to calculate the client performance counters.

* * * * *